United States Patent
Sagonas et al.

(10) Patent No.: US 11,023,708 B2
(45) Date of Patent: Jun. 1, 2021

(54) WITHIN DOCUMENT FACE VERIFICATION

(71) Applicant: ONFIDO LTD, London (GB)

(72) Inventors: Christos Sagonas, London (GB); Joao Silva Gomes, London (GB); Jacques Cali, London (GB)

(73) Assignee: ONFIDO LTD

( * ) Notice: Subject to any disclaimer, the term of this patent is extended or adjusted under 35 U.S.C. 154(b) by 54 days.

(21) Appl. No.: 16/449,069

(22) Filed: Jun. 21, 2019

(65) Prior Publication Data

US 2019/0392196 A1    Dec. 26, 2019

(30) Foreign Application Priority Data

Jun. 21, 2018   (EP) .................................... 18179055

(51) Int. Cl.
| | |
|---|---|
| *G06K 9/00* | (2006.01) |
| *G06T 7/11* | (2017.01) |
| *G06K 9/32* | (2006.01) |
| *G06N 3/04* | (2006.01) |

(52) U.S. Cl.
CPC ....... *G06K 9/00228* (2013.01); *G06K 9/3233* (2013.01); *G06N 3/04* (2013.01); *G06T 7/11* (2017.01); *G06T 2207/30201* (2013.01)

(58) Field of Classification Search
CPC .......... G06K 9/00221; G06K 9/00228; G06K 9/002568; G06K 9/00288; G06K 9/00295; G06K 2009/00328; G06K 9/00442; G06K 9/2018; G06K 9/46; G06K 9/6201; G06K 9/6202; G06T 2207/30201; B42D 25/23; B42D 25/24; B42D 25/30; B42D 25/309; B42D 25/324; B42D 25/328; B42D 25/333; B42D 25/351; B42D 2033/04; B42D 2033/06

See application file for complete search history.

(56) References Cited

U.S. PATENT DOCUMENTS

| | | | |
|---|---|---|---|
| 10,452,897 B1 * | 10/2019 | Benkreira | G06K 9/00288 |
| 2006/0157559 A1 | 7/2006 | Levy et al. | |
| 2015/0294139 A1 * | 10/2015 | Thompson et al. | G06K 9/00993 382/112 |
| 2017/0351909 A1 * | 12/2017 | Kaehler | G06K 9/00456 |

(Continued)

OTHER PUBLICATIONS 18179055.1, "Extended European Search Report", dated Dec. 5, 2018, 7 pages.

(Continued)

*Primary Examiner* — Andrew W Johns
(74) *Attorney, Agent, or Firm* — Kilpatrick Townsend & Stockton LLP

(57) ABSTRACT

A computer-implemented method for determining whether images of faces contained in a document correspond to each other. The method comprises acquiring image data pertaining to the document and performing facial detection on the image data to detect one or more facial representations existing within the document. If two or more facial representations are detected, a first facial representation and a second facial representation are selected, and determination of whether the image of a face of the first facial representation corresponds to the image of a face of the second facial representation is performed.

14 Claims, 7 Drawing Sheets

(56) References Cited

U.S. PATENT DOCUMENTS

2019/0362169 A1* 11/2019 Lin et al. ............ G06K 9/00288
2020/0042772 A1* 2/2020 Feng .................... G06K 9/6215

OTHER PUBLICATIONS

Alcantarilla, et al., "KAZE features", European Conference on Computer Vision, Oct. 7, 2012, pp. 214-227.

Bay, et al., "Speeded-up robust features (SURF)", Computer vision and image understanding, 110(3), 2008, pp. 346-359.

Isola, et al., "Image-to-image translation with conditional adversarial networks", IEEE Conference on Computer Vision and Pattern Recognition, 2017, pp. 1125-1134.

King, "Dlib-ml: A Machine Learning Toolkit", Journal of Machine Learning Research,10, 2009, pp. 1755-1758.

Lowe, "Distinctive Image Features From Scale-Invariant Keypoints", IJCV, 60(2), 2004, pp. 91-110.

Matthews, et al., "Active Appearance Models Revisited", Journal International Journal of Computer Vision, vol. 60, Issue 2, Nov. 2004, pp. 135-164.

Ojala, et al., "Multiresolution gray-scale and rotation invariant texture classification with local binary patterns", IEEE Transactions on pattern analysis and machine intelligence, 24(7), 2002, pp. 971-987.

Parkhi, et al., "Deep Face Recognition", BMVC vol. 1, No. 3, 2015, pp. 1-6.

Simonyan, et al., "Very deep convolutional networks for large-scale image recognition", arXiv:1409.1556v6, Apr. 10, 2015, pp. 1-14.

Trigeorgis, et al., "Mnemonic descent method: A recurrent process applied for end-to-end face alignment", Proceedings of the IEEE Conference on Computer Vision and Pattern Recognition, 2016, pp. 4177-4187.

Viola, et al., "Rapid Object Detection Using a Boosted Cascade of Simple Features", Proceedings of the 2001 IEEE Computer Society Conference on Computer Vision and Pattern Recognition (CVPR), vol. 1, 2001, pp. 511-518.

Yang, et al., "Stacked Hourglass Network for Robust Facial Landmark Localisation", IEEE Conference on Computer Vision and Pattern Recognition Workshops, 2017, pp. 2025-2033.

Zhang, et al., "Joint face Detection and Alignment Using Multitask Cascaded Convolutional Networks", IEEE Signal Processing Letters, 23(10), 2016, pp. 1499-1503.

* cited by examiner

WITHIN DOCUMENT FACE VERIFICATION

CROSS-REFERENCES TO RELATED APPLICATIONS

This application claims priority to European Patent Application Number 18179055.1, filed Jun. 21, 2018.

FIELD OF THE DISCLOSURE

The present disclosure relates to a method for determining whether images of faces contained in a document correspond to each other. More specifically it relates to a computer-implemented method for testing the authenticity of an official document based on whether the images of faces contained in the official document correspond to each other.

BACKGROUND OF THE INVENTION

Official documents are often used to check and test the identity of people. This is typically done manually. For example, a representative of a car rental company may check a customer's driving license before authorising the rental of a car to the customer. Such checking implicitly requires manual verification of the presented documents to check their authenticity. This manual verification is typically based on any number of known standard checks which the assessor may or may not choose to perform.

One problem that is encountered is that people may use forged or counterfeit documents to present false details. In the case of manual verification, the authenticity of a document is assessed using an assessor's experience and many factors are taken into account. Often, an assessor will suspect a presented document is not authentic, but will not be able to identify on what factor they base their assessment. An assessor's ability to assess documents will also be limited by their experience with particular types of documents. Therefore, it is likely that an assessor will struggle to accurately assess rarely used documents or documents of a new type with which they have limited experience.

Manual verification is therefore a highly skilled and labour intensive process that may lead to uncertainty and processing bottlenecks. For this reason, various systems have been developed to assist and automate aspects of this assessment. One such system uses a barcode scanner to scan a barcode on a document and check that the barcode relates to a valid number, or a number that is associated with the details presented on the document.

However, such systems have drawbacks. For example, an up to date database of the associated information must be maintained to avoid false alerts being raised with genuine documents. To correctly assess the authenticity of presented documents, the systems will also need to cope with all previous versions and multiple different types of genuine documents. For example, driving licenses from one country can have a different format and structure to driving licenses from another country, and it is impossible for a human assessor to have detailed knowledge of the various types and format of authentic documents which are permitted. As another specific example, the formatting of a barcode on recently issued driving licenses might be different to older driving licenses and an automated authenticity assessment system using barcodes needs to have details of both versions of the driving license to perform assessment correctly. Moreover, not all documents use the same anti-forgery or anti-counterfeiting measures and it is unfeasible to have a system that can deal with all of the possible measures that may be presented.

One particular anti-counterfeiting measure that is found on many types of official documents uses facial images. The present invention uses computational analysis on facial images present in the documents to overcome the above-mentioned problems.

BRIEF SUMMARY OF THE INVENTION

The present invention is defined by the independent claims, with further optional features being defined by the dependent claims.

There is provided a computer-implemented method for determining whether images of faces contained in a document correspond to each other, the method comprising: acquiring image data pertaining to the document; performing facial detection on the image data to detect one or more facial representations existing within the document; if two or more facial representations are detected, selecting a first facial representation and a second facial representation; determining whether the image of a face of the first facial representation corresponds to the image of a face of the second facial representation.

Optionally, acquiring image data pertaining to the document may comprise acquiring at least one image of at least a part of the document. The at least one image may be acquired using one or more of: a visible-light camera, which may be integrated in a user electronic device, an ultraviolet camera, and an infrared camera. Additionally or alternatively, the at least one image may be acquired by transferring from a memory. The memory may be integrated in a user electronic device, or may be in or accessible by a web server. The at least one image may consist of a single image, or comprise multiple images. Optionally, the at least one image may be stored in a memory once acquired.

Optionally, acquiring image data pertaining to the document may further comprise manipulating the at least one image to obtain image data pertaining to the document. Manipulating the at least one image to obtain image data may comprise applying one or more image transforms to the at least one image, such as rotation, resizing, contrast adjustment, brightness adjustment, colour adjustment, gamma correction. Alternatively or additionally, manipulating the at least one image to obtain image data pertaining to the document may comprise cropping the at least one image.

The image data pertaining to the document may consist of a single document image, which may comprise multiple facial representations. Thus, manipulating the at least one image to obtain data pertaining to the document may optionally comprise forming a single document image from the at least one image. Alternatively, the image data pertaining to the document may comprise multiple document images, wherein at least two of the multiple document images may comprise a facial representation.

Preferably, performing facial detection on the image data comprises using at least one face detection algorithm. Optionally, a first face detection algorithm may be used to detect a first facial representation and a second face detection algorithm may be used to detect a second facial representation. The least one face detection algorithm is preferably trained via a machine learning algorithm.

The one or more facial representations each comprise an image of a face, and may each have one or more computer-readable characteristics. For example, a facial representation may be formed of pixels, which may be of varying shades, greyscale, or colour, or may be formed of alphanumeric characters. Additionally or alternatively, a facial representation may be visible under visible light, or under only ultraviolet or infrared light. A facial representation may also be a hologram.

Selecting a first facial representation and a second facial representation may be performed automatically based on one or more detected computer-readable characteristics of the detected facial representations. For example, the first facial representation may be formed of pixels, and the second representation may be formed of alphanumeric characters. Alternatively, selecting a first facial representation and a second facial representation may be performed automatically by random selection. Optionally, if three or more representations are detected, the method may comprise selecting a third facial representation and a fourth facial representation and performing the determining step using the third facial representation and the fourth facial representation.

Optionally, determining whether the image of a face of the first facial representation corresponds to the image of a face of the second facial representation may comprise determining whether the image of a face of the first facial representation matches the image of a face of the second facial representation.

Preferably, determining whether the image of a face of the first facial representation corresponds to the image of a face of the second facial representation comprises the steps of: extracting at least one feature from each of the first facial representation and the second facial representation; combining the extracted features to produce a pair-feature representation; and determining whether the image of a face of the first facial representation corresponds to the image of a face of the second facial representation using the pair-feature representation.

Optionally, determining whether the image of a face of the first facial representation corresponds to the image of a face of the second facial representation may further comprise determining at least one feature for extraction from each of the first facial representation and the second facial representation. The determining may be performed via computer vision algorithm such as a KAZE algorithm, or a Local Binary Patterns (LBP) algorithm. Additionally or alternatively, the determining may be performed via a Deep Neural Network (DNN), which may be trained by deep machine learning. In some instances, the at least one feature may consist of multiple features, where at least one feature of the multiple features is determined by a computer vision algorithm and at least one feature of the multiple features is determined by a DNN.

Preferably, determining whether the image of a face of the first facial representation corresponds to the image of a face of the second facial representation is performed using a machine learning algorithm. The machine learning algorithm may be trained using pair-feature representations.

Optionally, combining the extracted features may comprise combining at least one feature extracted from the first facial representation with at least one corresponding feature extracted from the second facial representation. Optionally, combining the extracted features may comprise combining all features extracted from the first facial representation with all features extracted from the second facial representation. In any case, combining the extracted features may comprise one or more of: concatenating the extracted features of the first facial representation with the extracted features of the second facial representation; adding the extracted features of the first facial representation to the extracted features of the second facial representation; and subtracting the extracted features of the second facial representation from the extracted features of the first facial representation, or subtracting the extracted features of the first facial representation from the extracted features of the second facial representation.

Optionally, prior to the determining, at least one transform may be applied to at least one of the first facial representation and second facial representation such that the first facial representation and the second facial representation are in the same representation space, which may be an embedded space. A first transform may be applied to the first facial representation to transform the first facial representation into the representation space of the second facial representation. Alternatively, a second transform may be applied to the second facial representation to transform the second facial representation into the representation space of the first facial representation. Alternatively, a first transform may be applied to the first facial representation and a second transform is applied to the second facial representation to transform both the first facial representation and the second facial representation into a representation space different from the representation space of the first facial representation and the representation space of the second facial representation. The at least one transform may be trained via a machine learning algorithm.

There is also provided a computer-implemented method for testing the authenticity of an official document comprising the above-described method, and further comprising: determining whether the document is authentic based on whether the image of a face in the first facial representation corresponds to the image of a face in the second facial representation.

Optionally, if the images of faces correspond, a flag may be set in memory which identifies the document as being authentic. Likewise, if the images of faces do not correspond, a flag may be set in memory which identifies the document as not being authentic. Optionally, if less than two facial representations are detected, a flag may be set in memory which identifies the document as being invalid. An indicator of any of the flags set in memory may be transmitted to a user electronic device, and the user may be optionally be alerted of the indicator received by user electronic device. When the indicator relates to the document being invalid, the indicator may prompt the user to acquire image data from a second document. The above-described method may then be repeated for the second document.

There is also provided a computer-readable medium comprising executable instructions for performing the above-described method.

There is also provided a computer comprising a processor configured to execute executable code stored in memory, wherein the executable code comprises instructions for performing the above-described method.

BRIEF DESCRIPTION OF THE DRAWINGS

The present disclosure is made by way of example and with reference to the accompanying drawings in which.

DETAILED DESCRIPTION OF THE INVENTION

Figure 1:
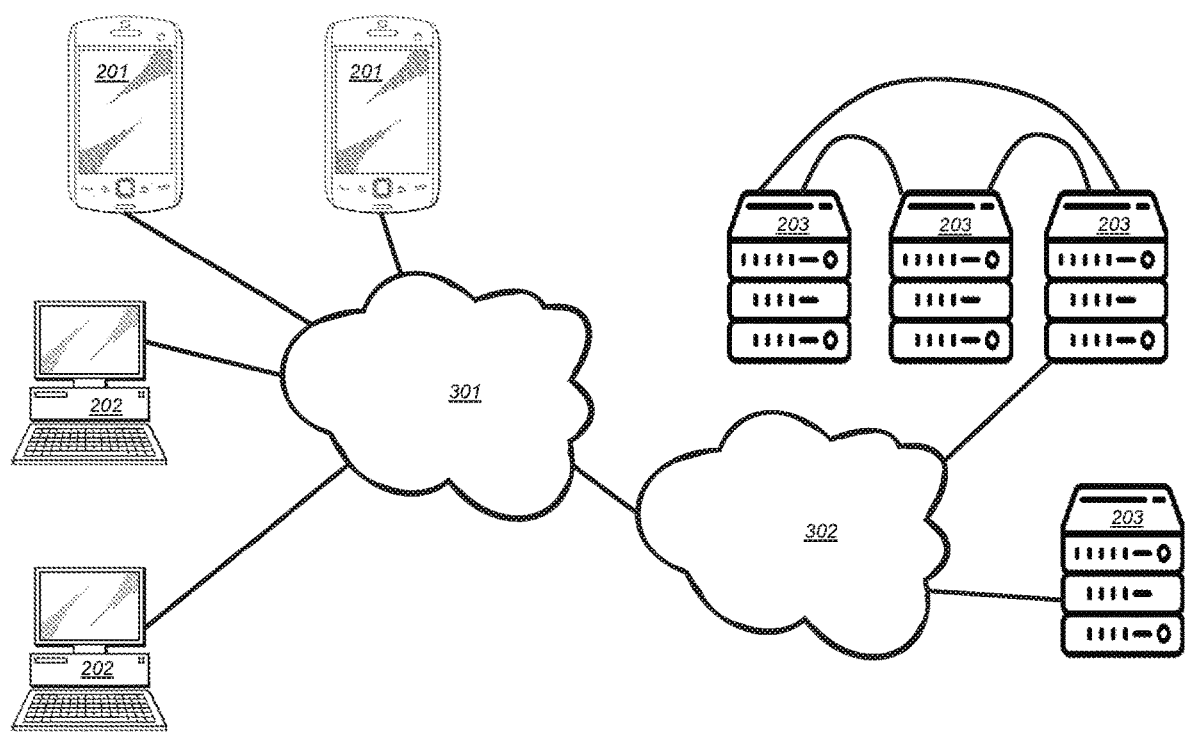
FIG. 1 is a component diagram of a system that may be used to implement the present invention.

FIG. 1 shows a system 10 in which, according to one embodiment, the disclosed method is implemented. The system comprises user electronic devices 201, 202, including mobile electronic device 201, fixed location electronic device 202, and server 203. The user electronic devices are in communication with at least one communication network 302 (which may, but not necessarily, include wireless network 301). Data may be communicated between the user electronic devices. The at least one communication network 302 may include the internet, an internet of things (IoT) network, a cellular network, or the like. The wireless network 301 may, for example, be a 4G LTE network or WiFi communication network, or any other conventionally known wireless communication network. The described network architecture is only exemplary and modifications to it, including removing or adding of network components, are possible.

Figure 2:
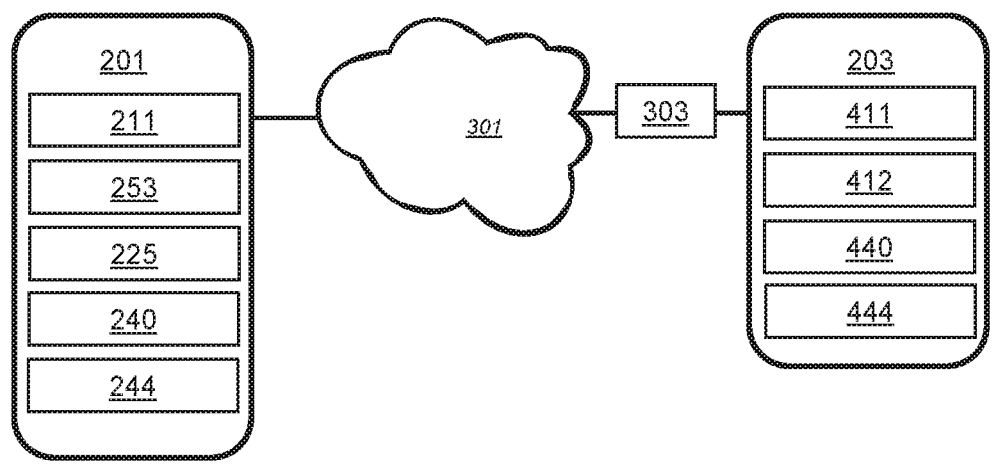
FIG. 2 is a diagram showing components of the system of FIG. 1.

FIG. 2 shows selected aspects of the network system 10 shown in FIG. 1. Specifically, it shows a mobile electronic device 201 in communication, over the wireless network 301, with a server 203. The server 203 is an electronic device that can be accessed across the network 302 by user electronic devices 201, 202 to perform computational tasks. The mobile electronic device 201 comprises a communication subsystem 211 to enable communication across the wireless network 301. The mobile electronic device 201 further comprises at least one application 225 that can be executed on a processor 240 and a camera 253 that can be used to acquire image data. The image data and applications 225 are stored in memory 244 on the mobile electronic device 201.

FIG. 2 also shows a server 203 which is connected to the wireless network 301 by a wireless network interface 303 and a network interface 411. The server 203 further comprises applications 412 that can be executed on a processor 440. The server further comprises memory 444 on which the applications 412 and any data that is received from the wireless network 301, and any electronic device connected thereto, can be stored. The server 203 may be distributed and comprise multiple servers, several processors and/or several memory storage locations. Such a distributed server 203 may operate by distributing computational tasks and data across its constitute parts and may communicate with other servers to perform computational operations.

Figure 3:
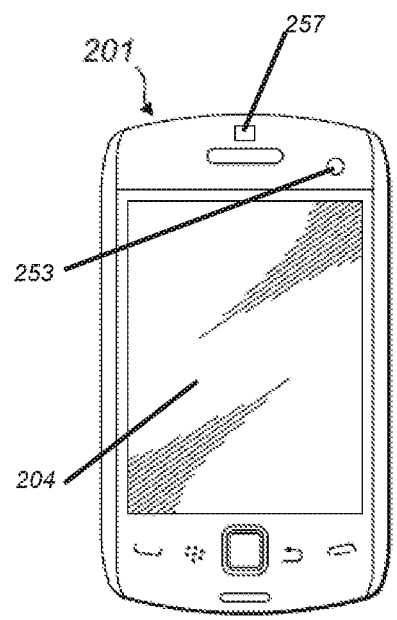
FIG. 3 is a front view of a user electronic device that may operate according to the present invention.
Figure 4:
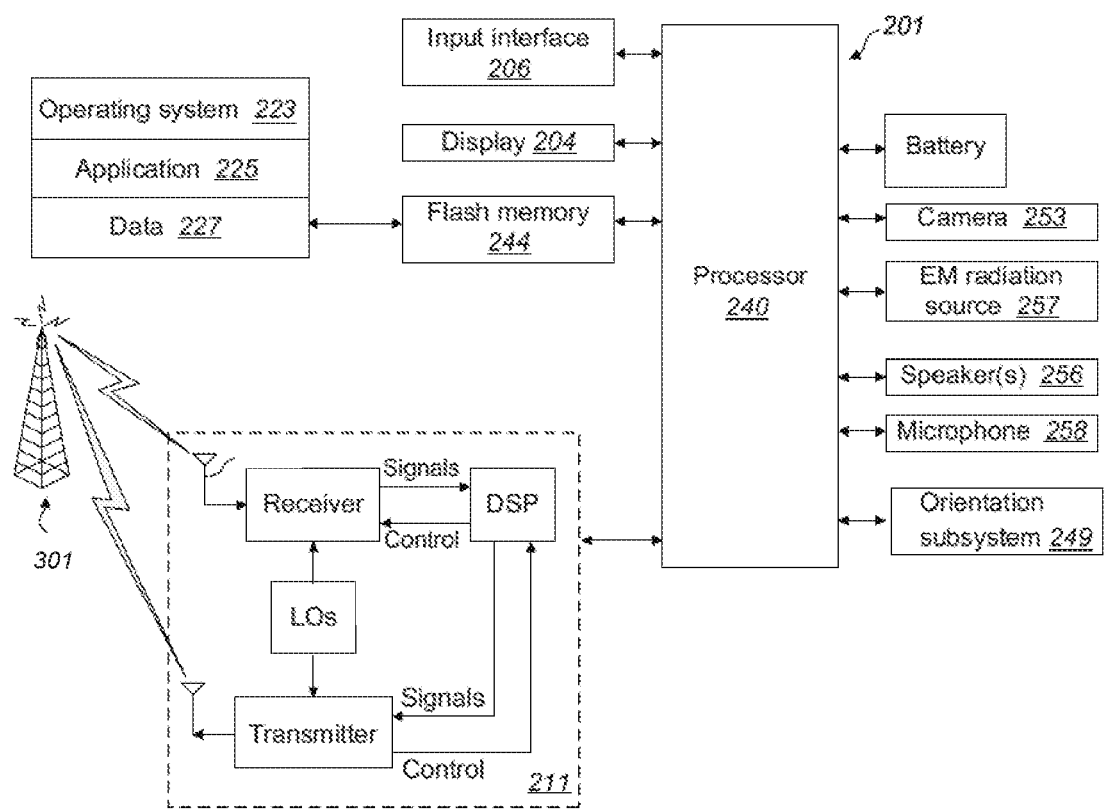
FIG. 4 is a schematic diagram of components of the user electronic device that may operate according to the present invention.

FIGS. 3 and 4 provide further details of the mobile electronic device 201 through which a user may work the method disclosed herein. The mobile electronic device 201 comprises a display 204, the camera 253, and an electromagnetic (EM) radiation source 257 for illuminating the area to be imaged with the camera 253. The mobile electronic device 201 is an example of a user electronic device by which a camera 253 may be used to capture image data of an official document 500. This image data may be communicated over the wireless network 301 to the server 203 and stored in the server memory 444. Other components of the mobile electronic device 201 include an input device 206, such as a touch screen or a keyboard, a microphone 258, and an orientation system 249, such as a gyroscope or GPS positioning system.

The memory 244 of the mobile electronic device 201 includes an operating system 223 which stores the computer-readable code for operating the mobile electronic device 201. As mentioned, the memory 244 also includes applications 225, such as identity authentication application 225, which are downloadable to memory 244 from server 203 via the at least one communication network 302, or are pre-stored on the memory 244. Other data 227 may also be present in memory 244 such as current and historical metadata of the mobile electronic device 201.

The fixed location device 202 may have similar components to the mobile electronic device 201. The components may be integrated into the fixed location device 202, or may be in communication with the fixed location device via a port in the fixed location device 202. For example, camera 253 may be connected to the fixed location device 202 via a USB port or similar in the fixed location device 202.

In the server 203, application software of the stored applications 412 executes on the processor 440 to acquire image data pertaining to the official document 500. The result of this extraction may be communicated back across the wireless network 301 to the mobile electronic device 201 and displayed on the display 204 to a user.

It will be understood that the system 10 described above is merely an exemplary system 10 for implementing the disclosed method defined herein.

An official document 500 may take one of many forms such as a driving license, a passport, a utility or other bill, a birth certificate, a benefits book, a state identity card, or a residency permit. The term "official document" is therefore intended to cover any document that contains structured information that may be used to verify a person's identity or an aspect relating a person, for example their address. The different forms of official document 500 may be referred to herein as being a particular "type" of official document 500, which may be further restricted by the territory of issue. For example, an official document type might be 'UK passport', a 'Finnish driving licence', etc.

Figure 5:
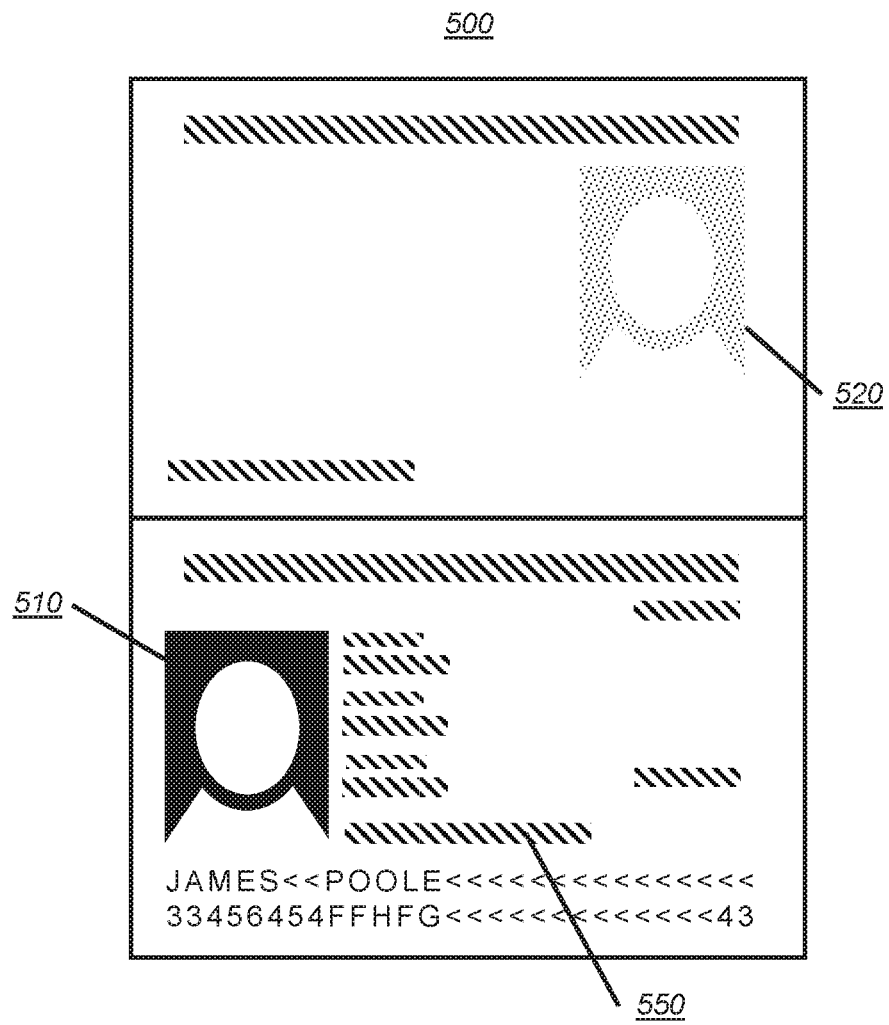
FIG. 5 presents a block image of an exemplary official document.

Referring to FIG. 5, there is an official document 500, which comprises at least one feature such as a facial photograph 510, a secondary facial image 520, or one or more lines of text 550. The at least one feature may be positioned in set locations within the official document 500. The at least one feature may also have set size and format. For example, in an exemplary official document 500, there may be positioned at 5 mm in from the left edge and 20 mm down from the top edge a facial photograph in a particular size and format. For example, the facial photograph may be 40 mm high and 20 mm wide, and depict a face formed of colour pixels (representing the natural colours of the face) at 1200 dots per inch. To reduce the likelihood of counterfeiting, the structure and format of the official document 500, and its constituent features, may be restricted or difficult to obtain and therefore reproduce. It will be appreciated that particular types of official document 500 have particular structures and formats.

One particular feature in an official document 500 that is useful for the disclosed method is a facial representation. The term "facial representation" as used herein is intended to mean any image of a face contained in the official document 500, for example facial photograph 510 and secondary facial image 520. Such facial representations are not restricted to images of faces obtained directly by photography, but also includes images of faces having one or more characteristics which deviate from those obtained directly by photography. For example, the facial representation may be an image of a face which is formed of alphanumeric characters, such as that shown in FIG. 6B.

Facial representations in an official document 500 have one or more characteristics which are specific to that type of official document 500. For example, a facial representation may be formed of pixels, or formed of alphanumeric and/or non-alphanumeric characters. In other types of official document 500, a facial representation may be visible in visible light, for example a hologram. Alternatively, a facial representation may only be visible under ultraviolet or infrared light. Other characteristics which are present in certain types of official document 500 are also suitable for use with the described method. These one or more characteristics may be computer-readable.

Figure 6A:
FIGS. 6A and 6B present exemplary facial representations.

As mentioned, in some types of official document 500, a facial representation is formed of pixels. This is the most common computer-readable characteristic of a facial representation in an official document. The pixels may have a range of shades, which may be either greyscale shades or colour shades, forming a greyscale facial representation or a colour facial representation respectively. Alternatively, the pixels may be selected from two shades or colours to form a binary facial representation. Where the facial representation is formed of pixels, the camera 253 of the user electronic device 201, 202 may be used to capture image data of an official document 500 which contains the facial representation formed of pixels. This image data may then be read by processor 240 or processor 440. The facial photograph 510 shown in FIG. 6A is an example of a binary facial representation formed of pixels.

Figure 6B:
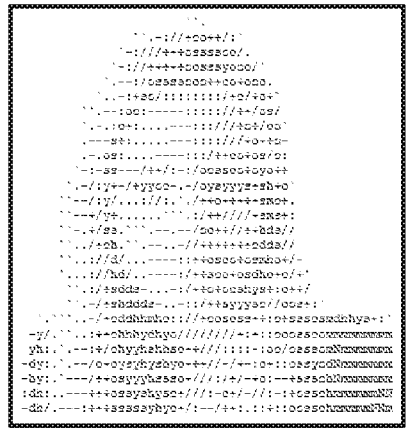

In some types of official document 500, a facial representation is formed of alphanumeric and/or non-alphanumeric characters. Alphanumeric characters may include both upper- and lower-case letters, A to Z, as well as the 10 Arabic numerals, 0 to 9. For official documents 500 written in certain languages, alphanumeric characters may also include letter variations such as é and ç. Non-alphanumeric characters may include punctuation characters (for example, !, @, #, (,), ?, /) as well as symbol characters (for example, ~, £, +, <, >). Optionally, the alphanumeric and/or non-alphanumeric characters may indicate an aspect relating a person such as a personal identifier. For instance, in an exemplary official document 500, the secondary facial image 520 is constructed from the letters and numbers that make up the surname and date of birth of the person. This aspect may be used to authenticate the official document 500, or to improve authentication of the official document 500. The second facial image 520 shown in FIG. 6B is an example of a facial representation formed of alphanumeric and/or non-alphanumeric characters.

Where the facial representation is formed of alphanumeric or non-alphanumeric characters, the camera 253 of the user electronic device 201, 202 may be used to capture image data of an official document 500 which contains the facial representation formed of alphanumeric and/or non-alphanumeric. This image data may then be read by processor 240 or processor 440. Optionally, the processor 440 may decipher from the alphanumeric and/or non-alphanumeric characters of the image data an aspect relating to the person.

It is appreciated that alphanumeric characters and non-alphanumeric characters are in fact formed of pixels. Thus, the alphanumeric and/or non-alphanumeric characters may have a range of shades, which may be either greyscale shades or colour shades. Alternatively, the alphanumeric and/or non-alphanumeric characters may be selected from two shades or colours. However, where it is mentioned herein that the facial representation is formed of pixels, it is intended to exclude the possibility that the facial representation is formed of alphanumeric or non-alphanumeric characters so as to distinguish these two types of facial representation.

In some types of official document 500, a facial representation is a hologram. Holograms are sometimes used in an official document 500 as an additional security feature. Where the facial representation is a hologram, the camera 253 of the user electronic device 201, 202 may be used to capture image data of an official document 500 which contains the hologram. Preferably, the image data comprises multiple images or a video of the official document 500. This image data may then be read by processor 240 or processor 440. Reconstruction of a two-dimensional image from the hologram may then be performed by processor 240 or processor 440 using any suitable image reconstruction algorithm known in the art.

A facial representation in an official document 500 captured according to the invention does not necessarily have to be normally visible under visible light to a human. In some types of official document 500, a facial representation may only be visible under ultraviolet light or under infrared light. Such facial representations are sometimes used in an official document 500 as an additional security feature. For instance, in an exemplary official document 500, the secondary facial image 520 may be printed in ink which is only viewable under ultraviolet light.

Where the facial representation is only visible under ultraviolet light or infrared light, the camera 253 of the user electronic device 201, 202 generally cannot be used to capture image data of an official document 500. Instead, the image data may be captured by an infrared camera 150 (not shown) or an ultraviolet camera 160 (not shown) which is in communication with the server 203 or the user electronic device 201, 202. This image data may then be read by processor 240 or processor 440.

The facial representation characteristics described above are merely exemplary based on those commonly seen in different types of official document 500. The facial representation may have other characteristics such as being formed of a thermochromatic ink, an ink that is reactive to particular solvents, an optically variable ink, a magnetic ink, a biometric ink, etc. Suitable detection methods for such inks which can communicate with the server 203 or one of the electronic devices 201, 202 are known in the art.

Overview of the Method

The disclosed method is directed towards testing the authenticity of an official document 500. An aspect of this method is determining whether the image of a face in each of two of the facial representations contained in the document correspond to one another, regardless of any difference in characteristics of the two facial representations. For example, referring to the exemplary facial representations in FIG. 6A and FIG. 6B, the method determines whether the image of a face in facial photograph 510 corresponds to the image of a face in the secondary facial image 520. Assuming that the facial photograph 510 and secondary facial image 520 are part of an official document 500, as shown in FIG. 5, the method then determines the authenticity of the document based on whether the images of faces were deemed to correspond.

Although in some instances the method described above may be performed by a human, such a determination is difficult for a human to make accurately as differences in the characteristics of the facial representations may obscure any differences in the images of the faces. In fact, it is often difficult for a human to decipher minor differences appearing in the images of faces of two facial representations because of differences already present in the two facial representations as a result of their different characteristics. The disclosed method overcomes this problem by implementing the method on a computer (for example, user electronic device 201, 202, or server 203) and using computer processing and computer-vision to exceed the limitations of human vision and visual analysis.

Figure 7:
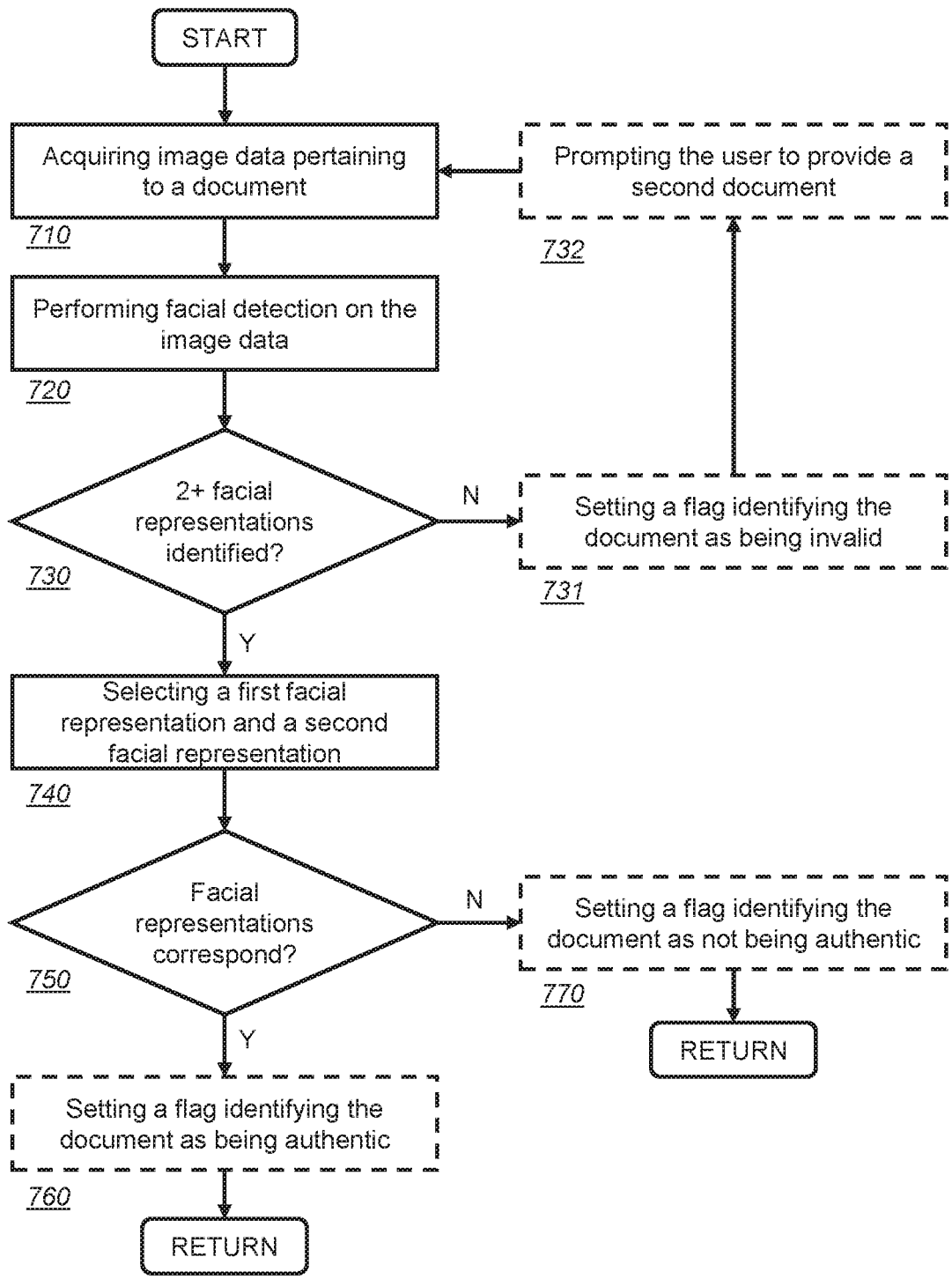
FIG. 7 presents a flow diagram according to the present invention.

Referring to FIG. 7, an overview of the disclosed method is provided below. The method is preferably performed by processor 440, although the method may alternatively be performed by processor 240, or be performed by processor 440 in conjunction with processor 240.

The method comprises the basic steps of:
acquiring image data pertaining to the document (step 710);
performing facial detection on the image data to detect one or more facial representations existing within the document (step 720);
if two or more facial representations are detected (step 730), selecting a first facial representation and a second facial representation (step 740);
determining whether the image of a face of the first facial representation corresponds to the image of a face of the second facial representation (step 750).

As noted from the step above, the method is not restricted to an official document 500, but may also be used for any document where at least two facial representations are present. For instance, the method may be used with two images of faces to determine if a copyright has been infringed.

The steps above are now described below in detail. The additional steps shown in FIG. 7 which are not mentioned above are optional and are also described below in detail.

Acquiring Image Data

With reference to step 710 of FIG. 7, the first step of the method is to acquire image data pertaining to the document.

Acquiring image data pertaining to the document preferably comprises acquiring at least one image of at least a part of the document. The at least one image may be of at least a page of the document, or a substantial portion of the page. For example, the at least one image may comprise at least 90% of the page.

The at least one image may comprise multiple images. The multiple images may be, for example, a first image comprising a first page of an official document 500 and a second image comprising a second page of an official document 500. For instance, referring to the official document 500 in FIG. 5, the first image may be of the lower page with the facial photograph 510, and the second image may be of upper page with the secondary facial image 520. Alternatively, the at least one image may consist of a single image. For instance, referring again to the official document 500 in FIG. 5, the single image may be of both the upper and lower pages.

The at least one image may be acquired via a camera 253 of a user electronic device 201, 202. For example, image data may be acquired via an identification authentication application 225 (or webpage) accessed via user electronic device 201, 202. When the application 225 is first accessed it loads and executes the applications on to the user electronic device 201, 202. The identification authentication application 225 may then prompt the user, via display 204 or speaker 256, to use the camera 253 to take a photograph of an official document 500, possibly using a separate camera application. Additionally or alternatively, the at least one image may be acquired by transferring from memory 244 of the user electronic device 201, 202. In such case, the identification authentication application 225 may allow the user to upload an image stored in memory 244 on the user electronic device 201, 202.

For facial representations with certain characteristics, such as those only visible in ultraviolet or infrared light, obtaining an image via a camera 253 of the user electronic device 201, 202 may not be possible. Instead, the at least one image may be acquired via a separate infrared camera 150 (not shown) or an ultraviolet camera 160 (not shown) which is in communication with the server 203 or the user electronic device 201, 202. Where the infrared camera 150 or the ultraviolet camera 160 is in communication with the user electronic device 201, 202, the identification authentication application 225 may prompt the user, via display 204 or speaker 256, to use the infrared camera 150 or the ultraviolet camera 160 to take a photograph of an official document, possibly using a separate camera application. Alternatively, where the infrared camera or the ultraviolet camera are in communication with the server 203, the application 412 may prompt acquisition of the at least one image via the infrared camera 150 or the ultraviolet camera 160.

Once the at least one image has been acquired, the at least one image may be stored in memory 244, or server memory 444. The memory 244 and/or server memory 444 may include permanent data storage, such as an optical hard drive, a solid state hard drive, a removable optical disk, etc. Alternatively or additionally, the memory 244 and/or server memory 444 may include non-permanent data storage, such as a cache or random access memory (RAM).

In some examples, the server memory 444 may have previously acquired and stored the at least one image. The at least one image may then be acquired via server memory 444 integrated in or accessible by a server 203, which is connected at least one communication network 302, rather than via identification authentication application 225.

Acquiring image data pertaining to the document may also involve acquiring metadata from the at least one image. The acquired metadata may include one or more of: when the image was captured, the size of the image, the author name, the focal length, the exposure time, the type of user electronic device 201, 202 and camera 253 used to capture the image, the GPS coordinates or the location the image was captured at, etc. This metadata may be used to assist in authenticating the official document 500.

Acquiring image data pertaining to the document may also involve creating metadata for the at least one image. The created metadata may include one or more of: personal details contained in the official document 500 such as name, date of birth, address, telephone number, nationality; and an indication of the type of official document 500 (e.g. passport). To achieve this, the at least one image may be passed through a data extraction pipeline that is capable of classifying the type of official document 500 in the image and extracting data from the classified document. One such data extraction pipeline is described in European patent application no. 18151286.4.

Once the at least one image has been acquired, the at least one image may be manipulated before facial detection is performed. Thus, acquiring image data pertaining to the document may further comprise manipulating the at least one image to obtain image data pertaining to the document.

The purpose of this manipulation is to manipulate the image data into a suitable form for facial detection. For example, the at least one image may be adapted such that image data pertaining to a particular type of official document 500 is put in a particular form which is made consistent for that type of document. Advantageously, by increasing the consistency of the input of the facial detection step, an improvement in the accuracy and consistency of the output of the facial detection step is achieved.

Manipulating the at least one image to obtain image data pertaining to the document may comprise applying one or more image transforms to the at least one image. The one or more image transforms may include: rotation, resizing, contrast adjustment, brightness adjustment, colour adjustment, gamma correction, etc., although any other image transformation and editing techniques may also be used. The one or more image transforms may be implemented in the disclosed method by any suitable image transform algorithm known to the skilled person.

In some cases, a different image transform may be applied to each image. For example, each image may be rotated until the top and bottom edges of the document appearing in the image are aligned with the horizontal axis of the image frame. In this case, the size of the rotation is likely to differ for each image, particularly if the images are captured by camera 253 of user electronic device 201, 202.

In some cases, the same image transform may be applied to each image. For example, the image transform may compensate for a particular characteristic of camera 253. The characteristic of the camera 253 to be compensated may be detected from the at least one image, or may be identified by the metadata of the at least one image. For instance, if the metadata of a number of images indicates a shorter than expected exposure time, the brightness may be adjusted in the same way for all of the images originating from camera 253 to compensate for the camera's characteristics.

Once the at least one image has been acquired, it may also be desirable to remove any image data which is not part of the document. For example, if the image data contains data representing a background behind the document, then this background data may be removed. This step is particularly useful if any facial representations appear in the background (for example, facial representations in a document behind the document being imaged, or the face of a user holding up the document), as removing these will improve the accuracy of the facial detection step. Accordingly, manipulating the at least one image to obtain image data pertaining to the document may comprise cropping the at least one image.

For images where both cropping and transformation are required, these processes may be performed in any order.

Once the at least one image has been acquired, the image data pertaining to the document may comprise multiple document images. In other words, each of the at least one images may form a single document image. In this case, at least two of the multiple document images should include a facial representation, otherwise face detection and matching cannot be performed. For example, referring to the official document 500 in FIG. 5, a first image of the lower page with the facial photograph 510 may be the first document image, and a second image of the upper page with the secondary facial image 520 may be a second document image. Without both facial photograph 510 and secondary facial image 520, face detection and matching cannot be performed.

Alternatively, the image data pertaining to the document may consist of a single document image.

This means that when the at least one image comprises multiple images, the multiple images must be formed into a single document image. In other words, the step of manipulating the at least one image to obtain data pertaining to the document may comprise forming a single document image from the at least one image. One exemplary method for forming a single document image is to position the multiple images adjacent to each other in a single image frame representing a document image. In other words, the multiple images are concatenated into a single document image. For example, referring to the official document 500 in FIG. 5, a first image of the lower page with the facial photograph 510, and a second image of the upper page with the secondary facial image 520 may be positioned in the way shown in FIG. 5 to form a single document image. Preferably, the single document images have at least two facial representations, otherwise face detection and matching cannot be performed.

Facial Detection

With reference to step 720 of FIG. 7, the second step of the method is to perform facial detection on the image data to detect one or more facial representations existing within the document. The aim of this step is to detect in the official document 500 all facial representations existing within that document, such as facial photograph 510 and secondary facial image 520.

Performing facial detection on the image data may be performed using at least one face detection algorithm on the image data. A face detection algorithm, as the name suggests, is an algorithm which detects human faces within image data. One suitable face detection algorithm for use with the disclosed method is discussed in Viola, P., and Jones, M., "Rapid Object Detection Using a Boosted Cascade of Simple Features," Proceedings of the 2001 IEEE Computer Society Conference on Computer Vision and Pattern Recognition (CVPR), Vol. 1, 2001, pp. 511-518. This particular face detection algorithm detects, in a cascading manner, a series of features in the image data that each represent part of a face. For example, the algorithm may first detect vertical bright bands in the image data that might represent a nose, then detect horizontal dark bands that might represent eyes, and then detect other general patterns associated with faces. Since the face detection algorithm discussed in Viola and Jones is based on conventional machine learning and computer vision techniques, only a small amount of training image data is required. Another suitable face algorithm for use with the disclosed method that is described in King, D. E., "Dlib-ml: A machine learning toolkit", Journal of Machine Learning Research, 10, pp. 1755-1758, 2009, is based on histogram of oriented gradients (HOG) features and support vector machines (SVM). Similar to Viola and Jones, the face detection algorithm in King requires only a small set of training image data.

When a large set of training image data is available, a deep learning method may be utilised for face detection. An exemplary face detection algorithm used for implementing a deep learning method is described in Zhang, K., Zhang, Z., Li, Z. and Qiao, Y., "Joint face detection and alignment using multitask cascaded convolutional networks", IEEE Signal Processing Letters, 23(10), pp. 1499-1503, 2016.

In many types of official document 500, there is variation in the size and hence resolution of each of the facial representations contained in that official document 500. Typically, the resolution of the facial photograph 510 is found to be higher than that of the secondary facial image 520. This difference may result in poor performance for a face detector algorithm which is used to detect both of the facial photograph 510 and the second facial image 520. In order to overcome this problem, the present method may employ two different face detection algorithms, one for each of the facial photograph 510 and the second facial image 520.

Thus, the step of performing facial detection on the image data may include using a first face detection algorithm and a second face detection algorithm on the image data. In such case, the first face detection algorithm may be configured to detect a higher resolution facial representation than the second face detection algorithm. In this way, the first face detection algorithm may be configured to detect a first facial representation, such as facial photograph 510, whereas the second face detection algorithm may be configured to detect a second facial representation, such as second facial image 520.

The first and second facial detection algorithms may be different types of face detection algorithm. For example, the first face detection algorithm may use the conventional machine algorithm and computer vision techniques discussed in Viola and Jones, whilst the second face detection algorithm may use the deep learning method discussed in King. The type of face detection algorithm may be chosen based on the availability of training image data. If a large amount of training data is available, face detection is preferably performed via the deep learning method.

To optimise the at least one face detection algorithm, training may be performed via a machine learning algorithm for a particular facial representation of a particular official document type, for example for facial photograph 510 of official document 500. In this way, the at least one face detection algorithm can be trained to find a specific facial representation contained in a document. As discussed above, this training may use a small or large amount of image data from sample official documents and/or computer-generated official document image data.

Of course, if more than two facial representations with different resolutions are contained within the document, then more than two face detection algorithms may be used on the image data. Generally speaking, the number of face detection algorithms may be the same as the number of facial representations typically found in a particular type of official document 500.

Once one or more facial representations have been detected within the document, the one or more facial representations may be stored in memory 244 and/or server memory 444.

Facial Representation

With reference to step 730 of FIG. 7, the third step is to determine whether two or more facial representations have been detected. This may be achieved by, for example, summing the number of facial representations stored in memory 244 and/or server memory 444, or storing in memory 224 and/or server memory 444 a total of the number of facial representations detected.

If it is identified that two or more facial representations have been detected, then the method proceeds to step 740. However, with reference to optional step 731 of FIG. 7, if less than two facial representations have been detected, a flag may be set in memory 244 and/or server memory 444 which identifies the document as being invalid. A "valid" document is defined as a document which comprises at least two facial representations.

Once a flag has been set in memory 224 and/or server memory 444, an indicator may be transmitted to the user electronic device 201, 202, prompting the user to acquire image data from a second document, as per step 732 of FIG. 7. For example, the identification authentication application 225 may display an error message and prompt the user, via display 204 or speaker 256, to provide a different document. Steps 710 to 730 may be repeated until a valid document is provided by the user.

With reference to step 740 of FIG. 7, once a valid document is provided, the next step is to select a first facial representation and a second facial representation from the two or more facial representations that have been detected.

Preferably, selecting a first facial representation and a second facial representation is performed automatically based on one or more computer-readable characteristics of the detected facial representations. The computer-readable characteristics are those described above. The first facial representation may be selected to have certain computer-readable characteristics, whereas the second facial representation may be selected to have other computer-readable characteristics. For example, the first facial representation may be a facial representation formed of pixels, such as facial photograph 510, and the second facial representation may be a facial representation formed of alphanumeric and/or non-alphanumeric characters, such as secondary facial image 520.

Additionally or alternatively, selecting a first facial representation and a second facial representation may be performed automatically based on the type of official document 500. In particular, the format of the particular type of official document 500 and its facial representations may be taken into consideration for selecting the first and second facial representations. For example, in exemplary official document 500 of FIG. 5, the facial photograph 510 may always be selected as the first facial representation, and the secondary facial image 520 may always be selected as the second facial representation. Thus, in addition to, or as an alternative to, using the characteristics of the facial representation, the first and second facial representations may be selected based on size, format, and/or position of the facial representation within the official document 500.

Alternatively, selecting a first facial representation and a second facial representation may be performed automatically by random selection. Any suitable randomised selection algorithm may be used to implement this selection.

With reference to FIG. 7, once the first and second facial representations are selected, the method may proceed to step 750 to determine if the image of a face in the first and second facial representations correspond. Optionally, if three or more facial representations have been detected, then a third facial representation and a fourth facial representation may be selected, and step 750 may additionally determine if the image of a face in the third and fourth facial representations correspond. This may be repeated for a fifth and sixth facial representation, etc., until all of the pairs of facial representations in the official document 500 have been tested.

The selection of the third, fourth, fifth, sixth, etc. facial representation may be performed in a similar way to the section of the first and second facial representation, as described above Determining Correspondence With reference to step 750 of FIG. 7, the next step is to determine whether the image of a face of the first facial representation corresponds to the image of a face of the second facial representation. The aim of this step is to ascertain whether the images of faces contained in the official document 500 are based on identical photographs of an identical person. Put another way, the step aims to ascertain whether the facial representations are derived from the same original photograph of a person.

By "correspond" it is meant that the image of a face of the first and second facial representations have a high degree of similarity, and thus a high likelihood of being the same image of a face.

In such case, the likelihood of being the same image of a face may be greater than a first threshold T1, where the first threshold may be one of: 50%, 60%, 70%, 80%, or 90%.

Optionally, the step of determining whether the image of a face of the first facial representation corresponds to the image of a face of the second facial representation may include determining whether the image of a face of the first facial representation matches the image of a face of the second facial representation. By "matches" it is meant that the image of a face of the first and second facial representations are required to have a higher degree of similarity than that required for correspondence, and thus a higher likelihood of being the same image of a face than for those deemed to correspond. In such case, the likelihood of being the same image of a face may be greater than a second threshold T2, where the second threshold may be one of: 95%, 99%, 99.5%, or 99.9%.

The required level of similarity will generally be defined by the exact application of the disclosed method. The specified threshold values given above are therefore merely exemplary.

The step of determining whether the image of a face of the first facial representation corresponds or matches to the image of a face of the second facial representation may be achieved by directly comparing the intensities of pixels that facial representations contain. However, the utilisation of pixel intensities could result in an inaccurate determination of whether the official document 500 is authentic. This is because pixel intensities are usually affected by different factors such as occlusion, illumination conditions, etc. particularly when the pixel intensities are derived from image data captured by a camera 253 of a user electronic device 201, 202. In order to overcome these problems, the disclosed method extracts features from each facial representation in order to perform the determination of correspondence or matching.

Figure 8:
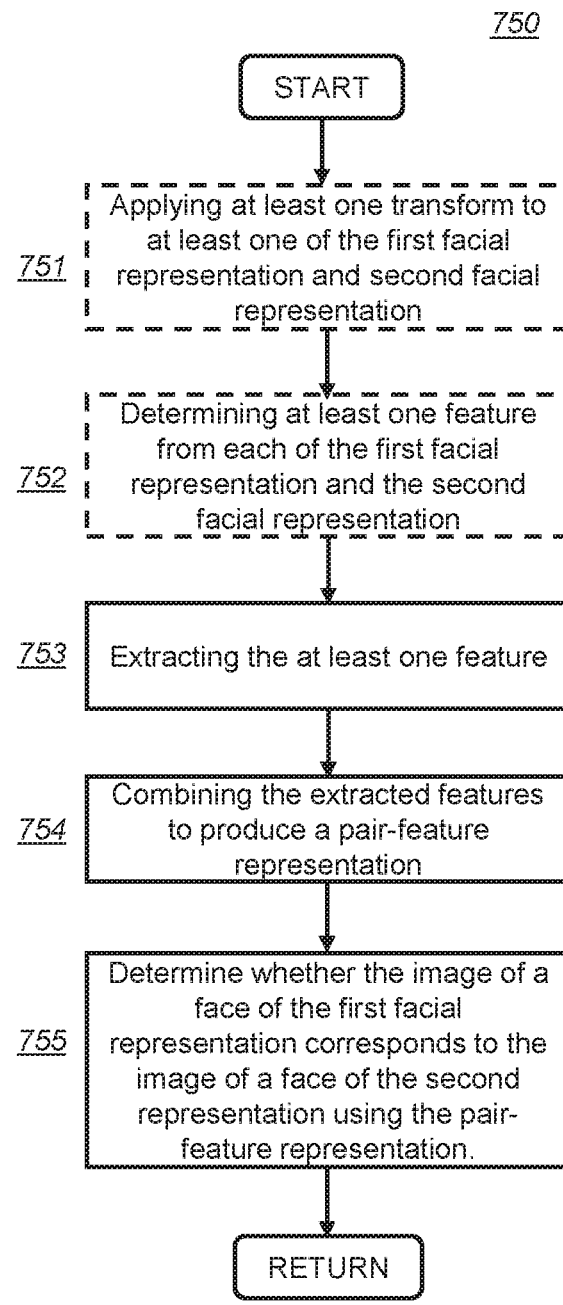
FIG. 8 presents a flow diagram for determining if facial representations correspond according to the present invention.

In particular, referring to FIG. 8, the step of determining whether the image of a face of the first facial representation corresponds to the image of a face of the second facial representation may comprise at least the steps of:

extracting at least one feature from each of the first facial representation and the second facial representation (step 753);

combining the extracted features to produce a pair-feature representation (step 754); and determining whether the image of a face of the first facial representation corresponds to the image of a face of the second facial representation using the pair-feature representation (step 755).

Each feature that is extracted from the first facial representation preferably corresponds to each feature that is extracted from the second facial representation. For instance, if the feature extracted from the first facial representation is the jawline, then the jawline will also be extracted from the second facial representation. Similarly, if the feature extracted from the first facial representation is the iris, then the iris will also be extracted from the second facial representation.

The extracted features may take many forms, such as a vector form or a bitmap form (also referred to as a raster form). The extracted features may be in a particular form for a particular extracted feature, depending on which form is most suitable for that type of feature. For example, if the extracted feature is the jawline, which can be represented as a single continuous line, then the extracted feature may take a vector form. In another example, if the extracted feature is the iris, which can be represented as a colour image, then the extracted feature may take a bitmap form.

Extracting the at least one feature from each of the first facial representation and the second facial representation may be performed by extracting holistic features from a preselected facial region. Suitable features for extraction may include, for example, one or more of: the forehead, which is bordered laterally by the temples and inferiorly by eyebrows and ears; the eyes, sitting in the orbit and protected by eyelids, and eyelashes; the nose, in particular its shape, the nostrils, and nasal septum; the cheeks covering the maxilla and mandibular (or jaw), the extremity of which is the chin; and the mouth, with the upper lip divided by the philtrum, and the teeth. These features are merely exemplary, and other features may be selected. Alternatively, other features may be determined by an automated means using facial landmarks. In particular, as is further discussed below, once facial landmark localisation is performed on the first and second facial representations, and the at least one feature may be extracted using image patches around the facial landmarks.

Once at least one feature has been extracted from each of the first facial representation and the second facial representation, the extracted features may be combined to produce a pair-feature representation. The pair-feature representation is named as such because it simultaneously represents the features present in the first facial representation and the second facial representation.

In some instances, the step of combining the extracted features may include combining at least one feature extracted from the first facial representation with at least one corresponding feature extracted from the second facial representation to form a pair-feature representation. In such a case, the pair-feature representation is associated with a single corresponding feature from each of the first facial representation and the second facial representation. Preferably, where more than one feature is extracted from each of the first facial representation and the second facial representation, each of the features extracted from the first facial representation are combined with each of the corresponding features extracted from the second facial representation to form multiple pair-feature representations. In such a case, each of the multiple pair-feature representations is associated with a single corresponding feature of each of the first facial representation and the second facial representation.

In other instances, the step of combining the extracted features may include combining all features extracted from the first facial representation with all features extracted from the second facial representation. In such instances, there will exist only a single pair-feature representation for the first facial representation and the second facial representation.

Several exemplary methods are described herein for combining the extracted features. However, the disclosed method should not be considered limited by these methods. Any other methods known to the skilled person for combining the extracted features may also be used with the disclosed method.

In some exemplary methods, the step of combining the extracted features may comprise concatenating the extracted features of the first facial representation with the extracted features of the second facial representation. Concatenation of the extracted features causes the features to be placed adjacent to one another in a single representation space in order to form a pair-feature representation. For instance, in the jawline example mentioned above, the pair-feature representation would consist of a first vector representing the jawline from the first facial representation and a second vector representing the jawline from the second facial representation.

In some exemplary methods, the step of combining the extracted features may comprise adding the extracted features of the first facial representation to the extracted features of the second facial representation. In other exemplary methods, the step of combining the extracted features may comprise subtracting the extracted features of the second facial representation from the extracted features of the first facial representation, or subtracting the extracted features of the first facial representation from the extracted features of the second facial representation. Addition or subtraction of the extracted features causes the features to be amalgamated together in a single representation space in order to form a pair-feature representation. For instance, in the iris example mentioned above, the pair-feature representation may consist of a single bitmap image created by subtracting each of the pixels of the bitmap image of the iris from the second facial representation from each of the pixels of the bitmap image of the iris from the first facial representation.

For concatenation, addition or subtraction of extracted features, the extracted features may be required to have the same width, height and data type. In other words, the extracted features may be required to be in the same representation space. Methods for transforming the facial representations to achieve this are further discussed below.

Once the extracted features have been combined into a single pair-feature representation, or multiple pair-feature representations, it should be determined whether the image of a face of the first facial representation corresponds to the image of a face of the second facial representation using the pair-feature representation.

The method used to determine whether the images of faces correspond may depend on the form of the pair-feature representation. For instance, in the jawline example mentioned above, where the pair-feature representation consists of a first vector representing the jawline from the first facial representation and a second vector representing the jawline from the second facial representation, the determination may be made based on how closely the vectors match, i.e. the distance between the vectors. In the iris example mentioned above, where there pair-feature representation consists of a single bitmap image, the determination may be made based on the extent of null values or near null values in the bitmap image. Note that these methods are merely exemplary, and other methods for determining whether the images of faces correspond are also considered within the scope of the disclosed method.

The methods for determining whether the images of faces correspond are performed by processor 240 or processor 440 to speed up the processing time and avoid bottlenecking, rather than by manual checks performed by a human. However, since there are many different forms of pair-feature representation, conventionally the identity authentication application 225 or stored applications 412 would be required to be manually programmed with a multitude of methods for determining whether the images of faces correspond, with each of the multitude of methods relating to a particular form of pair-feature representation. Moreover, since the number of different types of official document 500 is vast, and there are consequently many different forms of facial representation (i.e. facial representations with different characteristics), a significant number of different methods would conventionally need to be manually programmed for determining whether the images of faces correspond. Such extensive manual programming is extremely time consuming.

In order to avoid the need for extensive manual programming, and to allow for the method to adapt to new forms of pair-feature representation easily, determining whether the image of a face of the first facial representation matches the image of a face of the second facial representation is performed using a machine learning algorithm. The machine learning algorithm determines whether a pair-feature representation is indicative of corresponding images of faces in the first facial representation and the second facial representation. Put another way, the machine learning algorithm is trained to classify pair-feature representations into those which are formed of images of faces which correspond, and those which are formed of images of faces which do not correspond.

The machine learning algorithm, such as a support vector machine (SVM), may be trained to classify the pair-feature representations using sample pair-feature representations. Typically a small number of around 10 or 20 sample pair-feature representations of a particular form are required by the machine learning algorithm to classify pair-feature representations into those which are formed of images of faces which correspond, and those which are formed of images of faces which do not correspond, with an acceptable degree of accuracy. The sample pair-feature representations used for training may be determined using sample official documents and/or computer-generated official document image data.

As mentioned above, the one or more features for extraction may be selected or determined by more complex means. In such a case, referring back to FIG. 8, the step of determining whether the image of a face of the first facial representation corresponds to the image of a face of the second facial representation may further comprise, prior to the extracting:

determining at least one feature for extraction from each of the first facial representation and the second facial representation (step 752).

As mentioned above, facial landmark localisation may be performed on the first and second facial representations to determine at least one feature for extraction from each of the first and second facial representations. Various methods may be used for facial landmark localisation, such as conventional machine learning methods, as described in Matthews, I. and Baker, S., "Active appearance models revisited", International Journal of Computer Vision, 60(2), pp. 135-164, 2004, and deep machine learning methods, as described in Yang, J., Liu, Q. and Zhang, K., "Stacked hourglass network for robust facial landmark localisation," IEEE Conference on Computer Vision and Pattern Recognition Workshops 2017, pp. 2025-2033, and Trigeorgis, G., Snape, P., Nicolaou, M. A., Antonakos, E. and Zafeiriou, S., "Mnemonic descent method: A recurrent process applied for end-to-end face alignment," Proceedings of the IEEE Conference on Computer Vision and Pattern Recognition, 2016, pp. 4177-4187.

Additionally or alternatively, determining at least one feature for extraction from each of the first facial representation and the second facial representation may be performed via a computer vision algorithm. Suitable computer vision algorithms include KAZE algorithms, Local Binary Patterns (LBP) algorithms, Scale Invariant Feature Transform (SIFT) algorithms, and speeded up robust features (SURF) algorithms, and the like. One suitable KAZE algorithm for use with the disclosed method is described in Alcantarilla P. F., Bartoli A., and Davison A. J., "KAZE features", European Conference on Computer Vision 2012 Oct. 7, pp. 214-227. One suitable LBP algorithm for use with the disclosed method is described in Ojala T., Pietikainen M., Maenpaa T., "Multiresolution gray-scale and rotation invariant texture classification with local binary patterns", IEEE Transactions on pattern analysis and machine intelligence, 24(7), 971-87, 2002. One suitable SIFT algorithm for use with the disclosed method is described in Lowe, D. G., "Distinctive image features from scale-invariant keypoints", International journal of computer vision, 60(2), 91-110, 2004. One suitable SURF algorithm for use with the disclosed method is described in Bay, H., Ess, A., Tuytelaars, T., & Van Gool, L. "Speeded-up robust features (SURF)," Computer vision and image understanding, 110(3), 346-359, 2008.

Additionally or alternatively, determining at least one feature for extraction from each of the first facial representation and the second facial representation may be performed via a Deep Neural Network (DNN). One suitable DNN for use with the disclosed method is described in Parkhi, O. M., Vedaldi, A., & Zisserman, A. "Deep Face Recognition", in BMVC Vol. 1, No. 3, p. 6, 2015. Another suitable DNN for use with the disclosed method is described in Simonyan, K. and Zisserman, A., "Very deep convolutional networks for large-scale image recognition," arXiv: 1409, 1556, 2014. The DNN may be trained by deep learning. Deep learning is a class of machine learning algorithm which characteristically uses a cascade of multiple layers of nonlinear processing units for extracting features, where each successive layer uses the output from the previous layer as input.

In some instances, the at least one feature may consist of multiple features. For example, the at least one feature may consist of two features, the jawline and the iris. The multiple features may include at least one feature determined by a computer vision algorithm and at least one feature determined by a DNN. Thus, in the example, the jawline may be determined by a computer vision algorithm such as a KAZE algorithm, and the iris by a DNN.

As a consequence of the above-mentioned steps for determining whether the images of faces correspond contained in the document correspond, in particular step 752, the disclosed method can easily be applied to new official document 500 types, with limited manual input. For instance, the only manual input required for a new document type (where it is assumed that there is limited training data) is that the feature extraction method should preferably be made via a computer vision algorithm rather than via a DNN.

As mentioned above, in some types of official document 500, the facial representations may have different characteristics. As a consequence of these different characteristics, face matching the image of a face of the first facial representation and the image of a face of the second facial representation to ascertain whether the images of faces are derived from the same original photograph of a person, without additional processing steps, may result in poor matching accuracy. For example, referring to FIGS. 6A and 6B, if facial photograph 510 is directly compared to secondary facial image 520, then it may be found that the images of faces do not correspond, even though the facial representations are derived from the same original photograph of a person. To address this, the disclosed method provides a means for moving the facial representations into the same representation space, causing the face matching is performed on images of faces in the same representation space. Moving the facial representations into the same representation space is performed by applying at least one transform to at least one of the first facial representation and the second facial representation.

Thus, referring back to FIG. 8, the step of determining whether the image of a face of the first facial representation corresponds to the image of a face of the second facial representation may further comprise, prior to the extracting or determining:

applying at least one transform to at least one of the first facial representation and second facial representation such that the first facial representation and the second facial representation are in the same representation space.

In some cases, a first extracting or determining method may be performed prior to applying the at least one transform, and a second extracting or determining method, different from the first, performed after the at least one transform has been applied. For example, a facial landmark localisation method may be performed prior to applying the at least one transform, and a computer vision algorithm and/or a DNN performed after the at least one transform has been applied.

In some cases, a first transform may be applied to the first facial representation to transform the first facial representation into the representation space of the second facial representation. Alternatively, a second transform, different from the first, may applied to the second facial representation to transform the second facial representation into the representation space of the first facial representation. Alternatively, a third transform, different from the first or second transform, may be applied to the first facial representation and a fourth transform, different from the first, second, or third transform, may be applied to the second facial representation to transform both the first facial representation and the second facial representation into a representation space different from the representation space of the first facial representation and the representation space of the second facial representation.

Where the first facial representation is selected to be a particular facial representation of a particular type of official document 500, and the second facial representation is selected to be another facial representation of that particular type of official document 500, the transform between the representation spaces of the first and second facial representation will be consistent documents of that type. For example, the transform between facial photograph 510 and secondary facial image 520 of official document 500 in FIG. 5 will be the same as the transform for another document of the same type. Thus, the at least one transform may be trained via a machine learning algorithm such as a DNN. A DNN that is suitable for use with the disclosed method is the Generative Adversarial Network described in Isola, P., Zhu, J. Y., Zhou, T. and Efros, A. A., "Image-to-image translation with conditional adversarial networks", IEEE Conference on Computer Vision and Pattern Recognition, 2017. This training may use a large amount of image data from sample official documents and/or computer-generated official document image data of a particular type of official document 500. For example, a database containing M pairs of images, where M greater than 50, where each pair contains two facial representations of the same face may be used to train the DNN.

Alternatively, the at least one transform may be estimated by determining the common space between the first facial representation and the second facial representation using components analysis techniques such the Linear Discriminant Analysis (LDA).

As mentioned above, the disclosed method can easily be applied to new document types for authenticating those documents. For new official document 500 types where the second facial representation of an official document 500 is displayed in a different representation space, then the at least one transform should be retained. Optionally, the face detection algorithm that is employed to detect the second facial representation may also be retrained.

Authentication

The method discussed above for determining whether images of faces contained in a document correspond to each other is useful for testing the authenticity of an official document 500. In particular, the determination of whether the official document 500 is authentic may be based on whether the image of a face in the first facial representation corresponds to the image of a face in the second facial representation.

Generally speaking, when the image of a face in the first facial representation corresponds to the image of a face in the second facial representation, the document is deemed to be an authentic official document 500. However, there are a few exceptional circumstances where the document may not be deemed to be an authentic official document 500, even if the first and second facial representations correspond. For example, if more than two facial representations were present in the document, and the images of faces in the first and second facial representations correspond, but the images of faces in the third and fourth representations do not correspond, then the document may not be deemed to be an authentic official document 500. Thus, for most types of official document 500, if at least one of the pairs of facial representations do not correspond then the document may not be deemed to be authentic. Likewise, if all of the pairs of facial representations correspond then the document may be deemed to be authentic. However, this is not necessarily true for all types of official document 500, for example types of official document 500 where images of more than one person's face are purposefully present in the official document 500 (e.g. a document with facial images of a parent and a child). In that case, a suitable number of pairs of facial representations should have corresponding images of faces. Using metadata which indicates the type of official document 500 may be useful in determining which facial representations should have corresponding images of faces.

A flag may be set in memory 244 and/or server memory 444 which identifies whether the document is deemed authentic or not based on whether the images of faces correspond. With reference to FIG. 7, step 760, if the images of faces correspond, a flag may be set in memory 244 and/or server memory 444 which identifies the document as being authentic. Similarly, with reference to FIG. 7, step 770, if the images of faces (of at least one pair) do not correspond, a flag may be set in memory 244 and/or server memory 444 which identifies the document as being not authentic.

It is noted that deeming or not deeming a document to be authentic is different from establishing whether the document is in fact authentic or counterfeit. Optionally, where a document is deemed to be not authentic, manual checks may be performed on the document to establish whether the document is in fact authentic or counterfeit. Accordingly, an indicator of the flag and other relevant data, such as document images or images or faces present in the document, may be transmitted to the an operator of the server 203 and/or a third party for manual checking. In some instances, only a sample of the documents not deemed to be authentic may be sent to the third party for manual checking. The operator of the server 203 and/or third party preferably has expertise in the particular type of official document 500 deemed to be not authentic.

If the flag is stored in the server memory 444, an indicator of the flag may be transmitted to a user electronic device 201, 202. The indicator may take the form of an electronic message transmitted to the user electronic device 201, 202, and may be readable by the identification authentication application 225. For example, the identification authentication application 225 may, in the case of a document that is deemed to be authentic, receive an indicator that validation of the document has been successful. Alternatively, the identification authentication application 225 may, in the case of a document that is deemed to be not authentic, receive an indicator that validation of the document has not been successful.

Once the indicator has been received by the user electronic device 201, 202, the user may be alerted of the indicator. For example, the identification authentication application 225 may cause display 204 of user electronic device to read "VALIDATION SUCCESSFUL" or "VALIDATION UNSUCCESSFUL", or to show a symbol to denote whether validation of the official document 500 has been successful, such as a tick or a cross. In another case, the identification authentication application 225 may cause speaker 256 to play a sound to denote whether validation of the official document 500 has been successful.

In some instances, it may be preferable for the identification authentication application 225 not to cause the display 204 or speaker 256 to alert the user that validation has not been successful (i.e. the document is deeded not to be authentic). Similarly, it may be preferable not to transmit the indicator of the flag to a user electronic device 201, 202 when validation has not been successful. This is intended to avoid raising suspicions to the user about documents which are suspected to be counterfeit so that appropriate action can be taken by the operator of the server 203 or a third party.

The following is a list of aspects of the disclosure, and forms part of the description.

Aspect 1. A computer-implemented method for determining whether images of faces contained in a document correspond to each other, the method comprising:
acquiring image data pertaining to the document;
performing facial detection on the image data to detect one or more facial representations existing within the document;
if two or more facial representations are detected, selecting a first facial representation and a second facial representation;
determining whether the image of a face of the first facial representation corresponds to the image of a face of the second facial representation.

Aspect 2. The computer-implemented method of aspect 1, wherein acquiring image data pertaining to the document comprises acquiring at least one image of at least a part of the document.

Aspect 3. The computer-implemented method of aspect 2, wherein the at least one image is acquired using a visible-light camera.

Aspect 4. The computer-implemented method of aspect 3, wherein the camera is integrated in a user electronic device.

Aspect 5. The computer-implemented method of aspect 2, wherein the at least one image is acquired using an ultraviolet camera.

Aspect 6. The computer-implemented method of aspect 2, wherein the at least one image is acquired using an infrared camera.

Aspect 7. The computer-implemented method of aspect 2, wherein the at least one image is acquired by transferring from a memory.

Aspect 8. The computer-implemented method of aspect 7, wherein the memory is integrated in a user electronic device.

Aspect 9. The computer-implemented method of aspect 7, wherein the memory is integrated in or accessible by a web server.

Aspect 10. The computer-implemented method of any of aspects 2 to 9, wherein the at least one image comprises multiple images.

Aspect 11. The computer-implemented method of any of aspects 2 to 9, wherein the at least one image consists of a single image.

Aspect 12. The computer-implemented method of any of aspects 2 to 11, wherein the at least one image is stored in a memory once acquired.

Aspect 13. The computer-implemented method of any of aspects 2 to 12, further comprising manipulating the at least one image to obtain image data pertaining to the document.

Aspect 14. The computer-implemented method of aspect 13, wherein manipulating the at least one image to obtain image data pertaining to the document comprises applying one or more image transforms to the at least one image.

Aspect 15. The computer-implemented method of aspect 14, wherein the one or more image transforms comprise one or more of: rotation, resizing, contrast adjustment, brightness adjustment, colour adjustment, gamma correction, of the at least one image.

Aspect 16. The computer-implemented method of any of aspects 13 to 15, wherein manipulating the at least one image to obtain image data pertaining to the document comprises cropping the at least one image.

Aspect 17. The computer-implemented method of any of aspects 13 to 15, wherein manipulating the at least one image to obtain data pertaining to the document comprises forming a single document image from the at least one image.

Aspect 18. The computer-implemented method of any preceding aspect, wherein the image data pertaining to the document consists of a single document image.

Aspect 20. The computer-implemented method of aspect 18, wherein the document image comprises multiple facial representations.

Aspect 21. The computer-implemented method of any of aspects 1 to 17, wherein the image data pertaining to the document comprises multiple document images.

Aspect 22. The computer-implemented method of aspect 21, wherein at least two of the multiple document images comprise a facial representation.

Aspect 23. The computer-implemented method of any preceding aspect, wherein performing facial detection on the image data comprises using at least one face detection algorithm.

Aspect 24. The computer-implemented method of aspect 23, wherein performing facial detection on the image data comprises using a first face detection algorithm and a second face detection algorithm on the image data.

Aspect 25. The computer-implemented method of aspect 24, wherein the first face detection algorithm is configured to detect the first facial representation.

Aspect 26. The computer-implemented method of any of aspects 24 or 25, wherein the second face detection algorithm is configured to detect the second facial representation.

Aspect 27. The computer-implemented method of any of aspects 23 to 26, wherein the at least one face detection algorithm is trained via a machine learning algorithm.

Aspect 28. The computer-implemented method of any preceding aspect, wherein each of the one or more facial representations comprises an image of a face.

Aspect 29. The computer-implemented method of any preceding aspect, wherein each of the one or more facial representation has one or more computer-readable characteristics.

Aspect 30. The computer-implemented method of aspect 29, wherein the facial representation is formed of alphanumeric characters.

Aspect 31. The computer-implemented method of aspect 29, wherein the facial representation is formed of pixels.

Aspect 32. The computer-implemented method of aspect 31, wherein the pixels are varying shades.

Aspect 33. The computer-implemented method of aspect 32, wherein the pixels are greyscale.

Aspect 34. The computer-implemented method of aspect 32, wherein the pixels are colour.

Aspect 35. The computer-implemented method of aspect 29, wherein the facial representation is a hologram.

Aspect 36. The computer-implemented method of aspect 29, wherein the facial representation is visible under visible light.

Aspect 37. The computer-implemented method of aspect 29, wherein the facial representation is visible under ultraviolet light only.

Aspect 38. The computer-implemented method of aspect 29, wherein the facial representation is visible under infrared light only.

Aspect 39. The computer-implemented method of any preceding aspect, wherein selecting a first facial representation and a second facial representation is performed automatically based on one or more detected computer-readable characteristics of the detected facial representations.

Aspect 40. The computer-implemented method of aspect 39, wherein the first facial representation is formed of pixels.

Aspect 41. The computer-implemented method of any of aspects 39 or 40, wherein the second facial representation is formed of alphanumeric characters.

Aspect 42. The computer-implemented method of any of aspects 1 to 38, wherein selecting a first facial representation and a second facial representation is performed automatically by random selection.

Aspect 43. The computer-implemented method of any preceding aspect, wherein if three or more representations are detected, selecting a third facial representation and a fourth facial representation and performing the determining step using the third facial representation and the fourth facial representation.

Aspect 44. The computer-implemented method of any preceding aspect, wherein determining whether the image of a face of the first facial representation corresponds to the image of a face of the second facial representation comprises determining whether the image of a face of the first facial representation matches the image of a face of the second facial representation.

Aspect 45. The computer-implemented method of any preceding aspect, wherein determining whether the image of a face of the first facial representation corresponds to the image of a face of the second facial representation comprises:

extracting at least one feature from each of the first facial representation and the second facial representation;

combining the extracted features to produce a pair-feature representation; and
determining whether the image of a face of the first facial representation corresponds to the image of a face of the second facial representation using the pair-feature representation.

Aspect 46. The computer-implemented method of aspect 45, further comprising determining at least one feature for extraction from each of the first facial representation and the second facial representation.

Aspect 47. The computer-implemented method of aspect 46, wherein the determining is performed via a computer vision algorithm.

Aspect 48. The computer-implemented method of 47, wherein the computer vision algorithm is a KAZE algorithm.

Aspect 49. The computer-implemented method of aspect 47, wherein the computer vision algorithm is a Local Binary Patterns (LBP) algorithm.

Aspect 50. The computer-implemented method of aspect 46, wherein the determining is performed via a Deep Neural Network (DNN).

Aspect 51. The computer-implemented method of aspect 50, wherein the DNN is trained by deep machine learning.

Aspect 52. The computer-implemented method of any of aspects 46 to 51, wherein the at least one feature consist of multiple features.

Aspect 53. The computer-implemented method of aspect 52, wherein the multiple features includes at least one feature determined by a computer vision algorithm and at least one feature determined by a DNN.

Aspect 54. The computer-implemented method of any of aspects 45 to 53, wherein combining the extracted features comprises combining at least one feature extracted from the first facial representation with at least one corresponding feature extracted from the second facial representation.

Aspect 55. The computer-implemented method of aspects 45 to 53, wherein combining the extracted features comprises combining all features extracted from the first facial representation with all features extracted from the second facial representation.

Aspect 56. The computer-implemented method of any of aspects 45 to 55, wherein combining the extracted features comprises concatenating the extracted features of the first facial representation with the extracted features of the second facial representation.

Aspect 57. The computer-implemented method of any of aspects 45 to 55, wherein combining the extracted features comprises adding the extracted features of the first facial representation to the extracted features of the second facial representation.

Aspect 58. The computer-implemented method of any of aspects 45 to 55, wherein combining the extracted features comprises subtracting the extracted features of the second facial representation from the extracted features of the first facial representation, or subtracting the extracted features of the first facial representation from the extracted features of the second facial representation.

Aspect 59. The computer-implemented method of any of aspects 45 to 58, wherein determining whether the image of a face of the first facial representation matches the image of a face of the second facial representation is performed using a machine learning algorithm.

Aspect 60. The computer-implemented method of aspect 59, wherein the machine learning algorithm is trained using pair-feature representations.

Aspect 61. The computer-implemented method of any preceding aspect, further comprising:
prior to the determining, applying at least one transform to at least one of the first facial representation and second facial representation such that the first facial representation and the second facial representation are in the same representation space.

Aspect 62. The computer-implemented method of aspect 61, wherein a first transform is applied to the first facial representation to transform the first facial representation into the representation space of the second facial representation.

Aspect 63. The computer-implemented method of aspect 61, wherein a second transform is applied to the second facial representation to transform the second facial representation into the representation space of the first facial representation.

Aspect 64. The computer-implemented method of aspect 61, wherein a first transform is applied to the first facial representation and a second transform is applied to the second facial representation to transform both the first facial representation and the second facial representation into a representation space different from the representation space of the first facial representation and the representation space of the second facial representation.

Aspect 65. The computer-implemented method of any of aspects 61 to 64, wherein the at least one transform is trained via a machine learning algorithm.

Aspect 66. A computer-implemented method for testing the authenticity of a document comprising the method of any preceding aspect, and further comprising:
determining whether the document is authentic based on whether the image of a face in the first facial representation corresponds to the image of a face in the second facial representation.

Aspect 67. The computer-implemented method of aspect 66, further comprising:
if the images of faces correspond, setting a flag in memory which identifies the document as being authentic.

Aspect 68. The computer-implemented method of aspect 66, further comprising:
if the images of faces do not correspond, setting a flag in memory which identifies the document as not being authentic.

Aspect 69. The computer-implemented method of aspect 66, further comprising:
if less than two facial representations are detected, setting a flag in memory which identifies the document as being invalid.

Aspect 70. The computer-implemented method of aspect 69, further comprising:
transmitting an indicator prompting the user to acquire image data from a second document, and repeating the method for the second document.

Aspect 71. The computer-implemented method of any of aspects 67 to 69, further comprising:
transmitting an indicator of the flag to a user electronic device Aspect 72. The computer-implemented method of aspect 71, further comprising alerting the user of the indicator received by user electronic device.

Aspect 73. A computer-readable medium comprising executable instructions for performing the method of any one of the preceding aspects.

Aspect 74. A computer comprising a processor configured to execute executable code stored in memory, wherein the executable code comprises instructions for performing the method of any one of the preceding aspects.

The present invention has been described above by way of example only, and modifications of detail may be made which fall within the scope of the invention which is defined by the appended claims.

What is claimed is:

1. A computer-implemented method for determining whether images of faces contained in a document correspond to each other, the method comprising:
    acquiring image data pertaining to the document; and
    performing facial detection on the image data to detect one or more facial representations existing within the document, wherein performing facial detection on the image data comprises using at least one face detection algorithm and wherein:
        if two or more facial representations are detected:
            selecting a first facial representation and a second facial representation; and
            determining whether the image of a face of the first facial representation corresponds to the image of a face of the second facial representation; and
        if fewer than two facial representation are detected, identifying the document as being invalid.

2. The computer-implemented method of claim 1, wherein acquiring image data pertaining to the document comprises acquiring at least one image of at least a part of the document.

3. The computer-implemented method of claim 2, wherein the at least one image is acquired using a visible-light camera, an ultraviolet camera, or an infrared camera, or by transferring from a memory.

4. The computer-implemented method of claim 2, further comprising manipulating the at least one image to obtain image data pertaining to the document,
    optionally comprising one or more of: applying one or more image transforms to the at least one image, cropping the at least one image, and forming a single document image from the at least one image.

5. The computer-implemented method of claim 4, wherein performing facial detection on the image data comprises using a first face detection algorithm and a second face detection algorithm on the image data,
    optionally wherein the first face detection algorithm is configured to detect the first facial representation and the second face detection algorithm is configured to detect the second facial representation.

6. The computer-implemented method of claim 1, wherein each of the one or more facial representation has one or more of the following computer-readable characteristics:
    the facial representation is formed of alphanumeric characters;
    the facial representation is formed of pixels, optionally wherein the pixels are pixels are varying shades, greyscale, or colour;
    the facial representation is a hologram;
    the facial representation is visible under visible light;
    the facial representation is visible under ultraviolet light only; and
    the facial representation is visible under infrared light only.

7. The computer-implemented method of claim 1, wherein selecting a first facial representation and a second facial representation is performed automatically based on one or more detected computer-readable characteristics of the detected facial representations.

8. The computer-implemented method of claim 1, wherein determining whether the image of a face of the first facial representation corresponds to the image of a face of the second facial representation comprises:
    extracting at least one feature from each of the first facial representation and the second facial representation;
    combining the extracted features to produce a pair-feature representation; and
    determining whether the image of a face of the first facial representation corresponds to the image of a face of the second facial representation using the pair-feature representation.

9. The computer-implemented method of claim 8, further comprising determining at least one feature for extraction from each of the first facial representation and the second facial representation via a computer vision algorithm or a deep neural network.

10. The computer-implemented method of claim 8, wherein combining the extracted features comprises one or more of:
    concatenating the extracted features of the first facial representation with the extracted features of the second facial representation;
    adding the extracted features of the first facial representation to the extracted features of the second facial representation;
    subtracting the extracted features of the second facial representation from the extracted features of the first facial representation; and
    subtracting the extracted features of the first facial representation from the extracted features of the second facial representation.

11. The computer-implemented method of claim 1, further comprising prior to the determining:
    applying at least one transform to at least one of the first facial representation and second facial representation such that the first facial representation and the second facial representation are in the same representation space.

12. The computer-implemented method of claim 11, wherein a first transform is applied to the first facial representation to transform the first facial representation into the representation space of the second facial representation, or
    wherein a second transform is applied to the second facial representation to transform the second facial representation into the representation space of the first facial representation, or
    wherein a first transform is applied to the first facial representation and a second transform is applied to the second facial representation to transform both the first facial representation and the second facial representation into a representation space different from the representation space of the first facial representation and the representation space of the second facial representation.

13. A computer-implemented method for testing the authenticity of a document comprising the method of claim 1, and further comprising:
    determining whether the document is authentic based on whether the image of a face in the first facial representation corresponds to the image of a face in the second facial representation.

14. A computer comprising a processor configured to execute executable code stored in memory, wherein the executable code comprises instructions for performing a method comprising:
    acquiring image data pertaining to the document; and
    performing facial detection on the image data to detect one or more facial representations existing within the document, wherein performing facial detection on the image data comprises using at least one face detection algorithm and wherein:
if two or more facial representations are detected:
   selecting a first facial representation and a second facial representation; and
   determining whether the image of a face of the first facial representation corresponds to the image of a face of the second facial representation; and
if fewer than two facial representations are detected, identifying the document as being invalid.

\* \* \* \* \*